United States Patent [19]

Schuster

[11] Patent Number: 4,518,065
[45] Date of Patent: May 21, 1985

[54] AXLE DRIVE MECHANISM

[75] Inventor: Max Schuster, Passau, Fed. Rep. of Germany

[73] Assignee: Zahnradfabrik Friedrichshafen AG, Friedrichshafen, Fed. Rep. of Germany

[21] Appl. No.: 374,878

[22] Filed: May 4, 1982

[30] Foreign Application Priority Data

May 6, 1981 [DE] Fed. Rep. of Germany ....... 3117772

[51] Int. Cl.³ ............................................. B60K 41/24
[52] U.S. Cl. .................................. 192/4 A; 192/18 A
[58] Field of Search ................. 192/4 A, 12 C, 18 A, 192/18 R, 70.27, 70.28, 70.29, 91 A

[56] References Cited

U.S. PATENT DOCUMENTS

| 3,791,499 | 2/1974 | Ryan | 192/70.27 |
| 3,814,222 | 6/1974 | Koivunen | 192/4 A |
| 4,114,479 | 9/1978 | Ashfield | 192/4 A |
| 4,410,073 | 10/1983 | Ehrlinger | 192/18 A |

FOREIGN PATENT DOCUMENTS 525124 8/1940 United Kingdom ............ 192/18 A

Primary Examiner—George H. Krizmanich
Attorney, Agent, or Firm—Karl F. Ross; Herbert Dubno

[57] ABSTRACT

An axle drive mechanism for an automotive vehicle whose transmission is connected to a continuously coupled axle. The mechanism has a drive shaft forming part of another axle, a drive wheel rotatably mounted on the drive shaft and operatively connected with the transmission and the selectively connected axle, a clutch between the wheel and the shaft actuatable for rotatably coupling the wheel and the shaft to selectively engage the other axle, and a parking brake for the axles. The parking brake comprises a housing, a first brake between the wheel and the housing, and a second brake between the shaft and the housing. A common actuator is provided for both brakes, thereby immobilizing both of the axles independently of the operation of the clutch.

4 Claims, 1 Drawing Figure

U.S. Patent    May 21, 1985    4,518,065
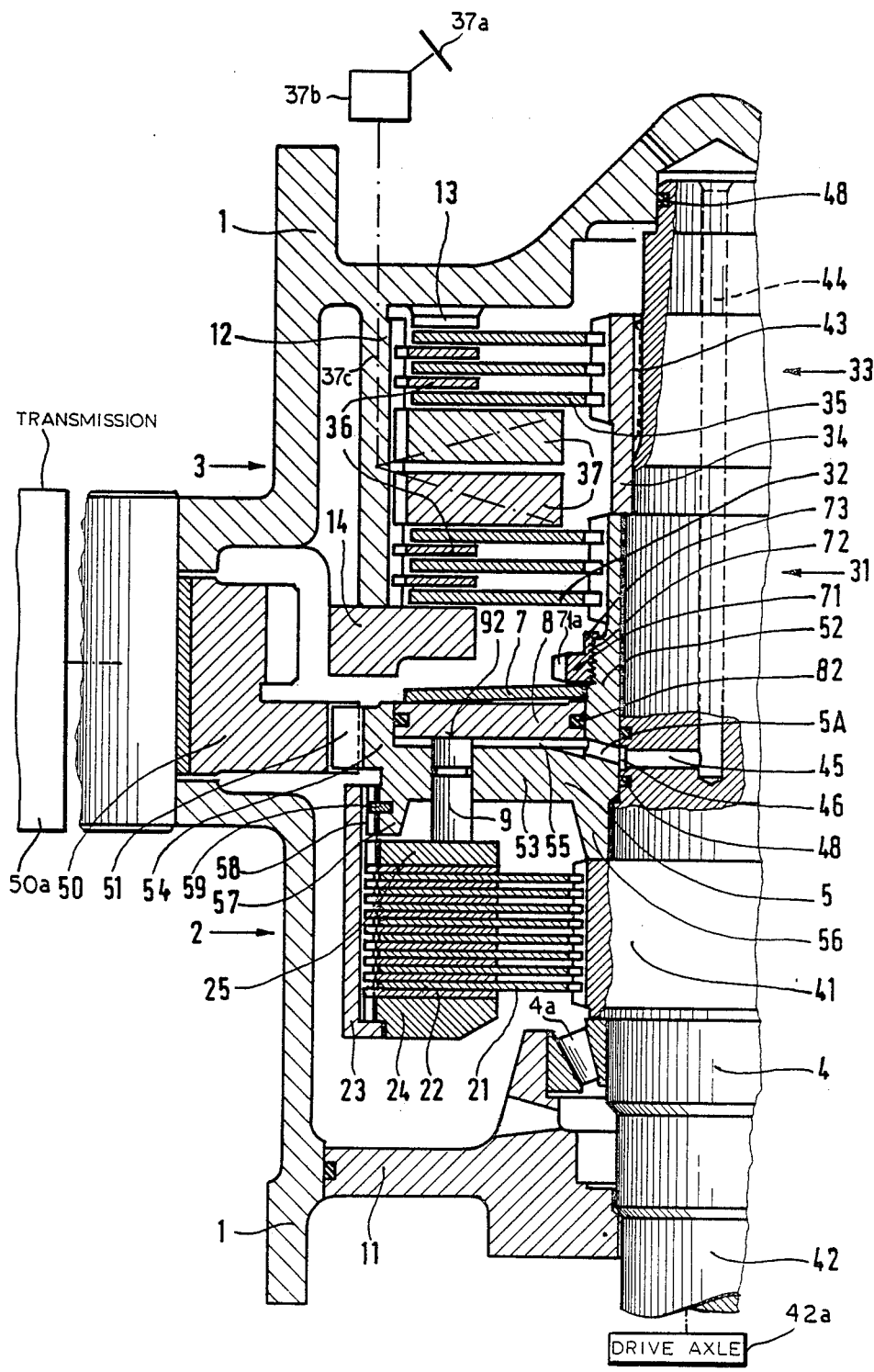

AXLE DRIVE MECHANISM

CROSS REFERENCE TO RELATED APPLICATION

This application relates to an improvement upon the axle drive mechanism described and claimed in the commonly assigned copending application Ser. No. 209,891 filed Nov. 24, 1980 now U.S. Pat. No. 4,410,073 issued Oct. 18, 1983 and based upon German patent document 29 48 895.

FIELD OF THE INVENTION

The present invention relates to an axle drive mechanism for a vehicle having a plurality of drive axles and, more particularly, to a vehicle having at least two drive axles, a drive wheel or gear associated with the axles, and a parking brake.

BACKGROUND OF THE INVENTION

It is known to provide a multi-axle vehicle in which the engine transmits power to a plurality of axles, each of which have at least one wheel and generally a pair of wheels for propelling the vehicle.

Such vehicles include so-called tractors, which can be provided with clutches selectively enabling the front axle to be coupled with the speed-changing transmission, which is provided between the axle and the engine.

Tractors of this type are provided with parking brakes which can be arranged either on the main drive axle or on the transmission. Such parking brakes have in common the fact that they are effective only upon the main drive axle, for example the rear axle which generally is continuously coupled with the transmission and engine.

As trucks and tractors for semitrailers or full trailers must be capable of displacing increasing loads, there has been a substantial increase in the development of front axle drives. It has thus become necessary to ensure that the parking brake or locking brakes will also be effective for the drivable front axle wheels as well.

In the aforementioned copending application, the problem of providing a parking brake for such multi-axle vehicles and especially vehicles which have a permanently driven rear axle and a clutch for the selective coupling of a front axle to the engine has been described. The mechanism which solves this problem comprises a main shaft, a drive wheel nonrotatably mounted on the main shaft, the clutch disk carrier nonrotatable but axially movable with respect to the drive wheel, whereby the main shaft can be brought into engagement with the drive wheel, and a parking brake lockable with respect to the drive wheel and the disk carrier.

This enables all of the drivable axle to be locked by the operation of the parking brake without having to consider the position of the clutch for the axle which is selectively engageable.

Thus, this arrangement provides a parking brake which shares the same housing as the clutch, which is allocated to the selectively operable drive axle, so that this parking brake connects the main drive axle and the selectively operable axle with the common housing when the clutch connects the selectively operable axle with the drive.

This arrangement has been found to be highly effective for modern tractors with high-front-end loading because both the front and rear axles are locked in a single operation.

While this system has been found to be fully effective, simplification, and structural and maintenance requirements have induced research into further improvements.

OBJECT OF THE INVENTION

It is thus the object of this invention to provide an axle drive mechanism with all of the advantages of the system described in the above identified copending application, but representing an improvement thereon.

SUMMARY OF THE INVENTION

This object is achieved, in accordance with the present invention, in an axle drive mechanism of the type described in the aforementioned copending application wherein the clutch for the engageable axle is arranged between the parking brake and this axle outside the brake circuit, and further is constructed and arranged so that the engageable drive axle itself is locked whenever the parking brake is actuated or set.

Thus, although the clutch is not included in the brake circuit of the parking brake, the selectively actuatable axle associated with this clutch is locked to the driving shaft upon actuation of the parking brake.

The engageable axle is consequently locked to the main drive axle whenever the parking brake is applied irrespective of the method in which the clutch is connected.

According to a feature of the invention, the parking brake is a disk-packet brake, i.e. a brake provided with clutch disks which are compressed.

The disk packet of the parking brake assigned to the main drive axle is preferably connected to this axle via the inner disks and the aforementioned drive wheel.

The disk packet associated with the engageable or selectively operable axle can be connected to the drive shaft of the latter via the inner disks, of this latter packet, the disk carrier and the main shaft.

I have also found that it is not essential that the locking forces acting on the individual drive shaft be equal and indeed they can vary depending upon the dimensioning of the friction surfaces, i.e. the disks, of the clutch packets.

The outer disks, expanding jaws which act upon them and associated reaction members can form part of a housing or be connected with it and, in accordance with the invention, a spring can be provided to apply pressure to the disks of the clutch which can selectively engage the auxiliary axle. The pressure of this spring on these disks can be applied via a pressure piston, a transmission piston and an independently movable disk while being adjustable by a setting ring provided with a safety mechanism and mounted on a collar of the drive wheel.

These features of the invention simplify the construction since the need for nested hollow shafts is eliminated. Furthermore, because the disk packets together with their inner disks can be connected directly with the drive wheel or via a disk carrier with the main shaft and not necessarily through the clutch, the locking forces can be altered simply and easily by varying the frictional surface area, e.g. by varying the number of plates or disks. The packets may have the same number of plates when equal frictional forces are desired or different numbers of plates.

The axial forces which derive from the expanding jaws via the disks of both disk packets are also supported simply against the housing itself or against components such as the supporting ring which can be simply mounted upon the housing as outlined previously.

Since it is possible to tension the spring or the clutch by means of a setting ring on the drive wheel, initial adjustment and readjustment due to wear is made easier and no bearings are required in the adjustment means to reduce friction losses.

BRIEF DESCRIPTION OF THE DRAWING

The above and other objects, features and advantages of the present invention will become more readily apparent from the following description, reference being made to the sole FIGURE of the accompanying drawing, which is a half section through an axle drive mechanism according to the invention.

SPECIFIC DESCRIPTION

The axle drive mechanism shown in the drawing is intended for use in a heavy-duty automotive vehicle, especially a tractor adapted to drawing a semitrailer or other heavy-load, the tractor having the usual set of rear driven wheels continuously connected in the drive train, and a front axle which can be selectively connected in the drive train.

In the drawing the axle drive is shown to comprise a clutch 2 which connects the front axle to the drive train, and a parking brake 3 which immobilizes the front axle, both the clutch and the parking brake being located in a housing 1.

An internal main shaft 4 extends into and is rotatably suspended in the housing, e.g. by a bearing 4a, and has a collar 41 which also serves as a disk carrier for the inner disks 20 of the clutch 2.

A cardan shaft connection 42 can tie the main shaft 4 via the usual universal joints with the driving axle which has been represented only symbolically at 42a.

The main shaft of the axle drive mechanism carries a drive wheel 5 which is mounted on the shaft 4 and can be driven by the radial teeth 51 of an intermediate gear 50 forming part of a transmission 50a. Thus, geear 50 is connected in the drive train in the usual manner and forms part of the transmission thereof, the transmission being driven by an engine (not shown).

A collar 52 of the drive wheel 5 which meshes with gear 50, carries not only the spring 7 but also a pressure piston 8 which, together with the web 53 and the tip of tooth crown 54, forms a pressure chamber 55. The spring 7 is a dished disk composed of spring metal.

In the embodiment illustrated, the spring 7 is axially supported by a setting ring 71 connected by a thread 72 with the collar 52 of the drive wheel or gear 5, thereby providing simple means for adjusting and readjusting the closing pressure of the clutch 2.

A safety mechanism (not shown), consisting of a pawl or pin engaging in the teeth 71a of the setting ring 71 can be provided to prevent undesired rotation of this ring. The safety mechanism itself may be adjustable and rotatable.

The collar 52 also carries the inner disks 32 of the disk packet 31 which brakes the main drive axle which has not otherwise been illustrated.

The wheel 5 is also provided with another collar 56 ensuring that the wheel 5 is axially supported against the collar 41 of the main shaft 4.

A further collar 57, on the same side of the drive wheel 5 as the web 53 close to the tooth crown 54, supports an outer disk carrier via splines or teeth 58 and an axial safety mechanism 59 acting as a stop after lost motion in both directions.

The outer disk carrier 23 not only supports the outer disks 22 which are interleaved with the disks 21, but an end disk 24 and an independently movable thrust ring 25. The web 53 of gear 5 has apertures through which the transmission pistons 9 can extend from the pressure piston 8 to the independently movable thrust ring 25.

A disk carrier 34 for the inner disks 35 of the packet 33 of parking brake 3 for the selectively engageable axle is connected with the main shaft 4 via a spline assembly 43.

An outer disk carrier 12 can be either integral with the housing 1 (as shown) or firmly connected with this housing and carries outer disks 36 and a pair of expanding jaws 37 respectively cooperating with the disk packets 31 and 33 of the parking brake. These disk packets are each allocated to a respective axle. For example, the packet 33 is allocated to the drive shaft 4 and thus to the selectively engageable axle 42a, being coupled thereto via the splines 43.

The disk packet 31 is coupled to the drive axle of the rear wheels (not shown) via the collar 52, the gear wheel 5 and the transmission 50 and 50a, which is permanently tied to the rear wheel axle.

When the jaws 37 are spread apart, they compress the respective disk packets 31 and 33 against the contact surface 13 for the packet 33 and against the ring 14 also fixed to the housing for the packet 31. Both shafts are braked by this parking brake which can have any actuating system for spreading apart the jaws 37 as represented, for example, by the pedal 37a, the control at 37b and the linkage 37c.

When clutch 2 is closed, a driving connection is established to the engageable axle from the transmission as a result of the pressure by spring 7 against the piston 8, the chamber 55 being relieved. The piston 8 thus moves downwardly in the drawing to press the pistons 9 against the plate 25 and compress the disk packets 21 and 22.

The size of the pressure surface 92 of the transmission can be altered so that a mixed residual force holds the disks 21 and 22 practically in engagement when the clutch is opened. If piston 9 is connected with piston 8, e.g. by forming them in a one-piece construction or by locking them positively with a spring ring, for example, it is possible to provide gaps between the disks 21 and 22 of the clutch 2.

If the brake linkage of the parking brake which urges the jaws 37 to spread apart is also connected to a service brake system, the parking brake 3 may also form a wear-resistant service brake.

The pressure chamber 55 for the clutch and the supply lines for the hydraulic fluid are sealed against pressure loss by seals 47 and 82.

When the parking brake 3 is applied, both the axle which can be rendered operable by the clutch 2 and the main drive axle continuously connected to the transmission are locked together and to the housing independently of whether the clutch 2 is opened or closed.

The disk packets 31 and 33 may differ in number of disks and friction areas so that the locking forces upon the respective drive shafts may be varied. Wear of the locked-engageable clutch for the drivable axle does not affect either parking brake since the clutch is not disposed in any of the forced transmission circuits of the parking brakes.

The parking brakes may be operated purely mechanically or hydraulically or pneumatically via conventional cam or lever mechanisms. Furthermore, instead of a linkage spreading the jaws 37 apart directly, springs may be provided for urging the jaws apart and these springs may be compressed by the actuating mechanism shown. Instead of dished disk springs as shown at 7, coil springs or the like may also be used as an alternative.

I claim:

1. An axle drive mechanism for an automotive vehicle having a transmission connected to a continuously coupled axle, said drive mechanism selectively connecting another axle with said transmission, said mechanism comprising:
    a drive shaft forming part of said other axle;
    a drive wheel rotatably mounted on said drive shaft and operatively connected with said transmission and the selectively connected axle;
    a clutch between said wheel and said shaft actuatable for rotatably coupling said wheel and said shaft to selectively engage said other axle with said wheel; and
    a parking brake for said axles, said parking brake comprising a housing, said shaft being rotatable relative to said housing, first brake means between said wheel and said housing, and second brake means between said shaft and said housing, and common actuating means for both said brake means, thereby immobilizing both of said axles independently of the operation of said clutch, said housing having a pair of spaced-apart walls juxtaposed with one another and axially spaced from said clutch and said wheel, said wheel having a collar reaching axially into a spece between said walls, said first and second brake means being located between said walls and said first brake means being braced against one of said walls, said second brake means being braced against the other of said walls, said first brake means including a first disk packet having inner disks axially shiftable but rotatably entrained on said collar of said drive wheel, and outer disks angularly fixed to said housing and axially shiftable thereon, said second brake means including a second disk packet having inner disk angularly coupled with said shaft and axially displaceable thereon, and outer disks axially displaceable on but angularly fixed to said housing, said common actuating means including a pair of plates on said housing urged apart to compress the respective disk packets.

2. The mechanism defined in claim 1 wherein said brake means are friction brakes with identical friction surfaces.

3. The mechanism defined in claim 1 wherein said brake means are friction brakes with different friction surfaces.

4. The mechanism defined in claim 1 wherein said clutch comprises a disk packet including inner disks angularly engaging said shaft and axially shiftable thereon, and outer disks angularly entrained with said wheel and means for clamping said packet of said clutch, said clamping means comprising a piston, including a spring bearing against said piston for compressing same to clamp said packet to said clutch, and adjusting means on said wheel including a setting ring threaded onto said wheel for adjusting the pressure of said spring against said piston.

* * * * *